Dec. 1, 1964  E. E. STEINBRECHER  3,159,023
ULTRASONIC TESTING APPARATUS
Filed Oct. 28, 1957  4 Sheets-Sheet 1
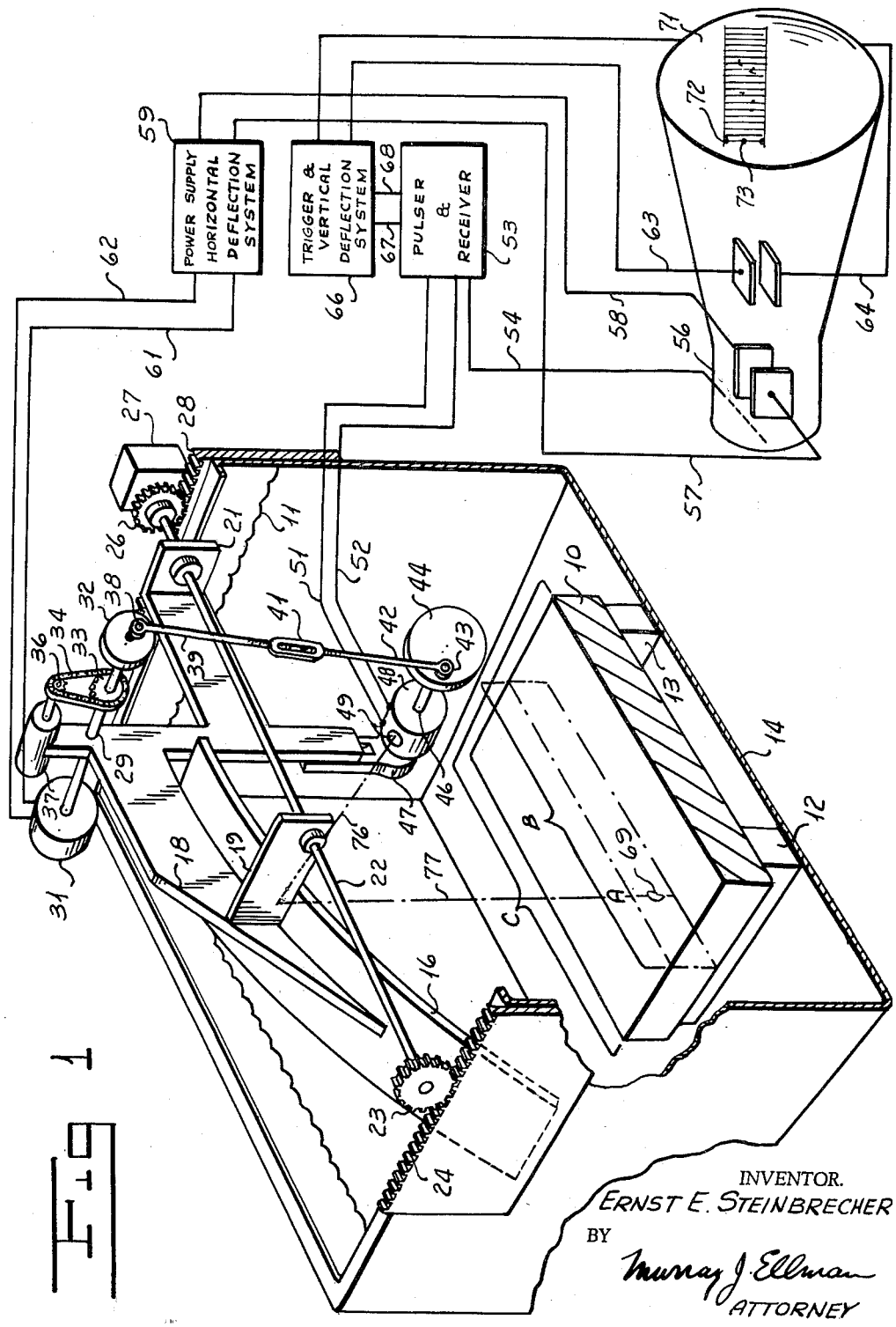
INVENTOR.
ERNST E. STEINBRECHER
BY
Murray J. Ellman
ATTORNEY

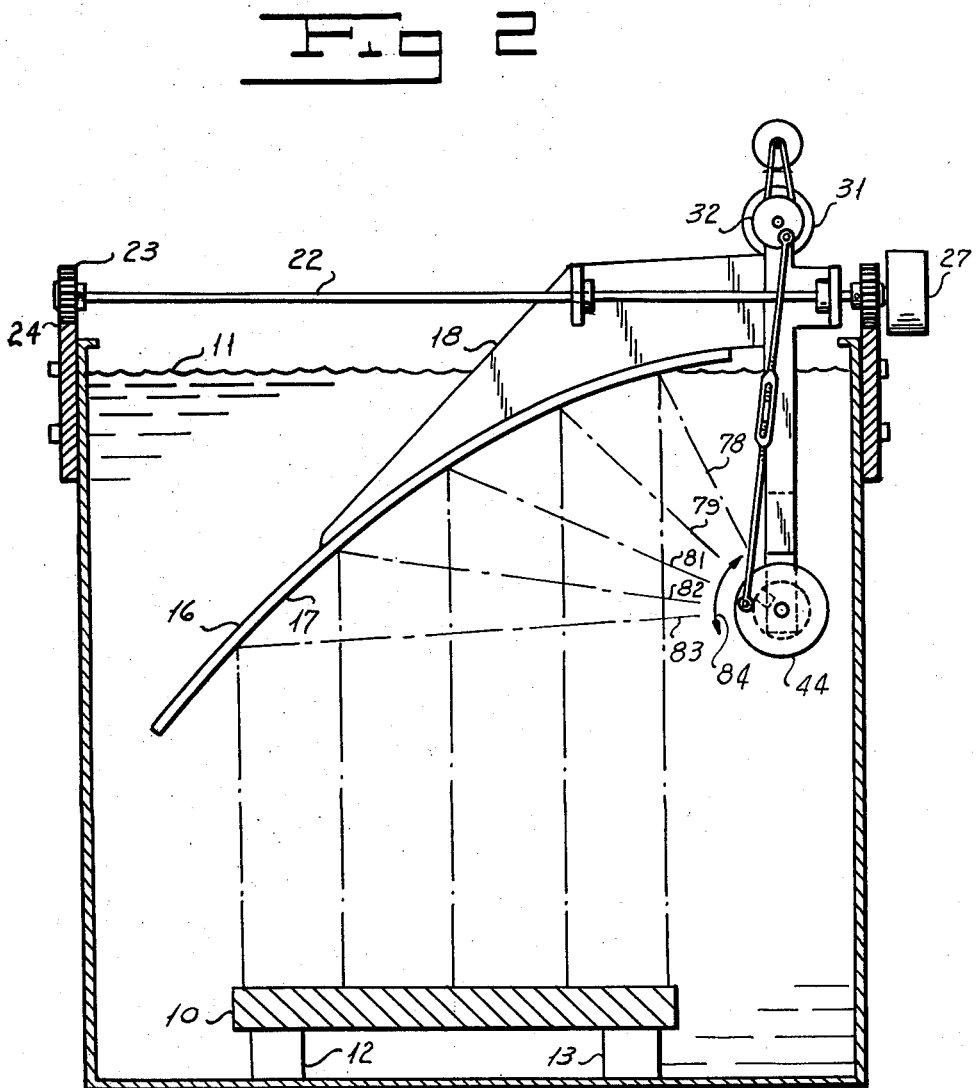

Dec. 1, 1964  E. E. STEINBRECHER  3,159,023
ULTRASONIC TESTING APPARATUS
Filed Oct. 28, 1957  4 Sheets-Sheet 3
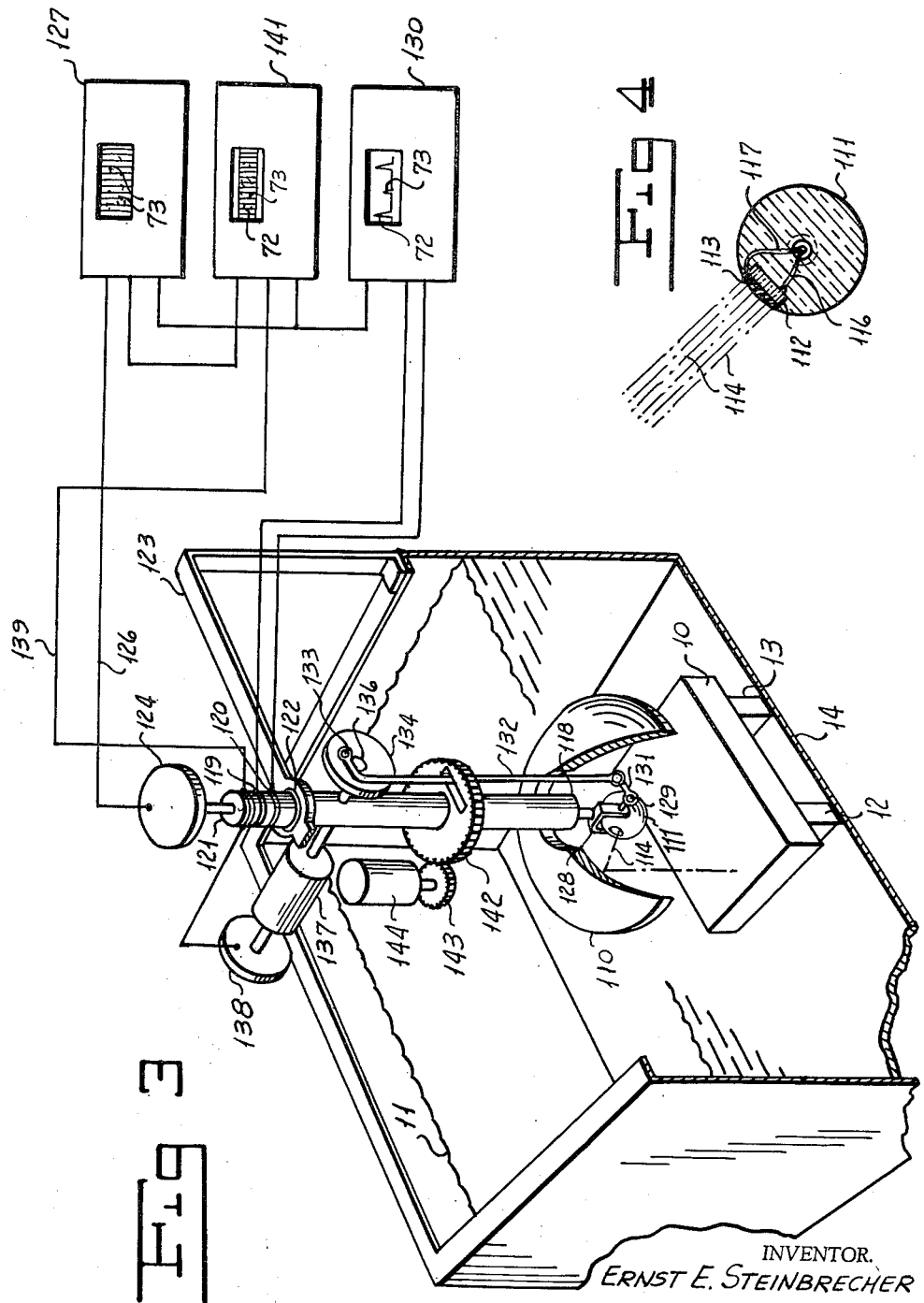
INVENTOR.
ERNST E. STEINBRECHER
BY
Murray J. Ellman
ATTORNEY Dec. 1, 1964  E. E. STEINBRECHER  3,159,023
ULTRASONIC TESTING APPARATUS
Filed Oct. 28, 1957  4 Sheets-Sheet 4
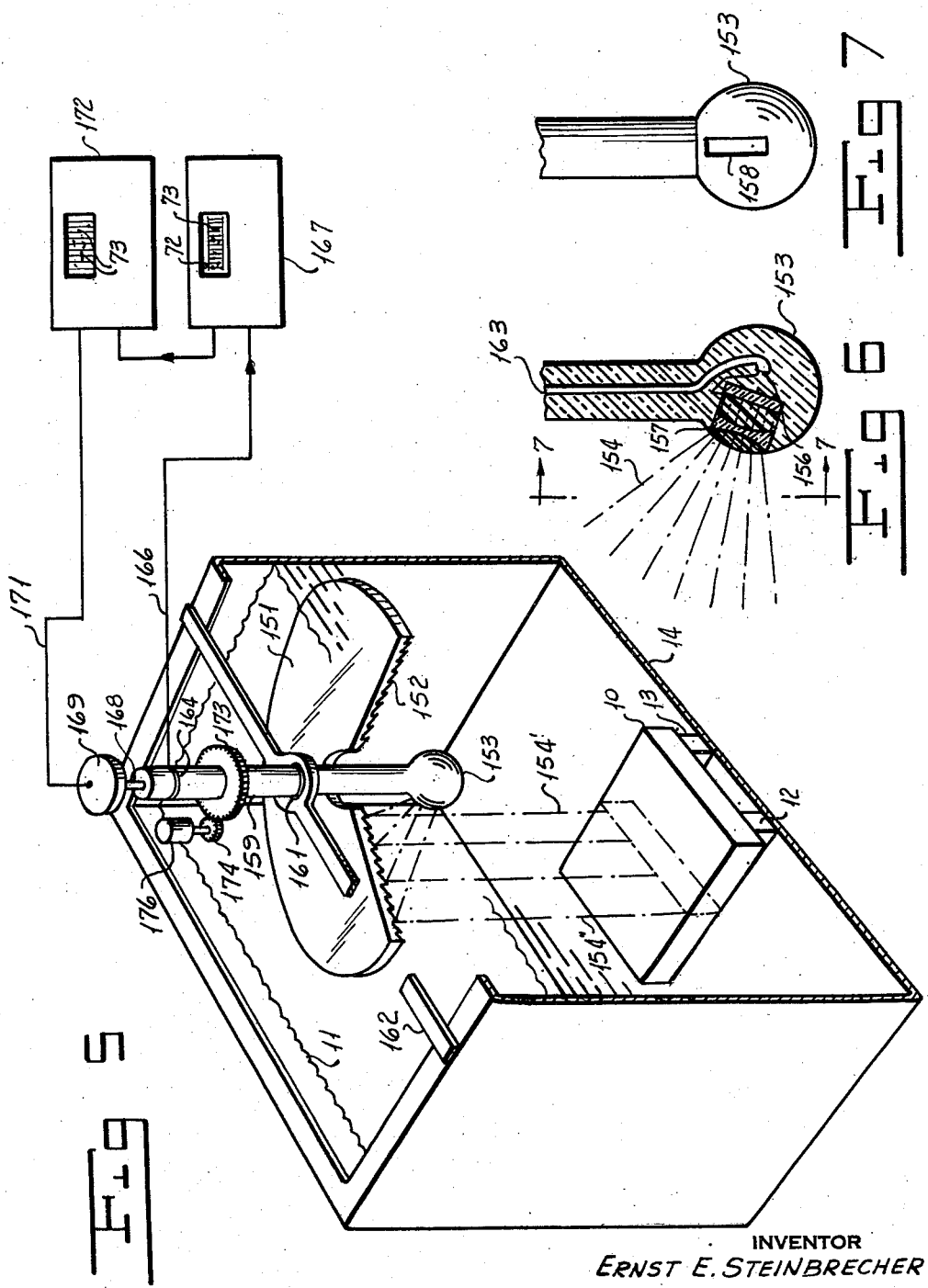
INVENTOR
ERNST E. STEINBRECHER
BY
Murray J. Ellman
ATTORNEY United States Patent Office 3,159,023
Patented Dec. 1, 1964

3,159,023
ULTRASONIC TESTING APPARATUS
Ernst E. Steinbrecher, Montclair, N.J., assignor, by mesne assignments, to The Budd Company, Philadelphia, Pa., a corporation of Pennsylvania
Filed Oct. 28, 1957, Ser. No. 692,643
2 Claims. (Cl. 73—67.8)

The present invention relates to a scanning system. More particularly, the present invention relates to a scanning system used with apparatus for the non-destructive testing of objects.

In non-destructive flaw detection systems, it is conventional practice to utilize a generator producing penetrating rays. The penetrating rays impinge upon the object under test and are reflected therefrom and transmitted therethrough. A receiver arranged in the reflection or transmission path of the rays after the same have impinged on the object indicates information about the characteristics of the object under test in view of the intensity and distribution of the rays that have impinged thereon.

In order to determine desired characteristics of an entire object, it is necessary to move the generator with respect to the object or vice versa so that the penetrating rays will impinge upon different respective portions of the object under test. When very large objects are to be tested, it can be seen that a considerable amount of testing time must be taken in order to provide sufficient relative movement between the generator of the penetrating rays and the object to cause the penetrating rays to scan the entire object under test.

It is clear that in order to speed up this testing time, the penetrating ray generator or the object must be moved at a quicker rate. Generally, the generator is moved while the object is held stationary. Therefore, in order to provide a complete scan of the object under test, it is necessary to move the generator back and forth across the object so that the generator sequentially scans different preselected portions of the object.

When ultrasonic vibrations are used for the non-destructive testing purposes, it is conventional practice to immerse the object to be tested in a tank containing liquid. Accordingly, any mechanical interaction between the liquid and the generator must be overcome for high speed movement of the generator with respect to a stationary object.

The present invention overcomes these difficulties present in prior art systems by arranging a reflector for the generated rays at a distance from the generator so that the penetrating rays generated by the generator may be reflected towards different preselected portions of the object under test merely by rotating or pivoting the generator or reflector.

It is accordingly an object of the present invention to provide an apparatus for overcoming the above described difficulties present in conventional apparatus.

A second object of the present invention is to provide a new and improved apparatus for the non-destructive testing of an object.

Another object of the present invention is to provide a new and improved ultrasonic flaw detector.

A further object of the present invention is to provide a new and improved non-destructive testing apparatus for an object wherein the penetrating rays used for testing the object can be directed towards any desired portion of the object by relatively little movement of the generator of the penetrating rays.

Still another object of the present invention is to provide new and improved apparatus for the non-destructive testing of an object wherein ultrasonic vibrations are reflected towards a preselected portion of the object under test by means of a parabolic reflector.

Still a further object of the present invention is to provide a new and improved ultrasonic flaw detector where the ultrasonic vibrations impinge on the object under test at a preselected angle and wherein the angle and/or portion on which the ultrasonic vibrations impinge can be varied with a much smaller corresponding motion of the transducer utilized to produce the ultrasonic vibrations.

With the above objects in view, the present invention mainly consists of an apparatus for the non-destructive testing of an object and includes a support member which is arranged to support the object under test. Ray generating means are provided for generating penetrating rays along a preselected path. Finally, ray directing means spaced from the generating means are included and arranged along the preselected path to direct the penetrating rays towards at least a preselected portion of the object under test. At least one of the ray generating means or the ray directing means is movable with respect to the other so that the directed rays can be directed towards any preselected portion of the object, whenever desired.

In a preferred embodiment of the present invention, ultrasonic vibrations are used for the testing of the object. The ray directing means is arranged in the form of a parabolic member while the transducer for producing the utlarsonic vibrations is mounted at the focal point thereof. The transducer is pivotally mounted and is arranged so that pivotal movement thereof produces a scanning of the object under test by means of the ultrasonic vibrations reflected from the parabolic reflector.

In still another preferred embodiment, the parabolic member is arranged as a parabolic mirror, that is a mirror whose surface is a paraboloid of revolution, with a rotatably mounted transducer arranged at the focal point thereof. Rotation of the transducer permits complete scanning of the object under test.

In a further embodiment, a mirror of special multi-parabolic construction described subsequently, is used to provide the over-all scanning.

The foregoing and other objects and advantages of the invention will appear more fully hereinafter from a consideration of the detailed description which follows, taken together with the accompanying sheets of drawings wherein preferred embodiments of the invention are illustrated by way of example. It is to be expressly understood, however, that the drawings are for the purpose of illustration and description only and are not intended as a definition of the limits of the invention.

In the drawings:

FIG. 1 is a diagrammatic perspective view, partially in section and partially distorted to illustrate details showing a first embodiment incorporating the present invention;

FIG. 2 is a side view of the embodiment shown in FIG. 1;

FIG. 3 is a diagrammatic perspective view, partially in section and partially broken away, showing a second embodiment of apparatus incorporating the present invention;

FIG. 4 is a transverse sectional view of the transducer support used in FIG. 3;

FIG. 5 is a diagrammatic perspective view, partially in section and partially broken away, showing a third embodiment of apparatus incorporating the present invention;

FIG. 6 is a transverse sectional view showing the transducer support of FIG. 5; and FIG. 7 is a side view of the transducer support shown in FIG. 6 when viewed in the direction of the arrows 7—7.

Referring to the drawings and more particularly to FIGS. 1 and 2, it can be seen that the object 10 under test is immersed within a liquid 11 and arranged on supporting members 12 and 13 in the bottom of a tank 14. Only the upper surface of the liquid medium 11 is shown in order to avoid unnecessarily complicating the drawings.

Arranged above the object 10 and also immersed within the liquid 11 is an arcuate member 16 with a surface portion 17 having a parabolic curvature. It can be seen that the arcuate member 16 is mounted on a bracket 18 having portions 19 and 21 which extend laterally of the bracket 18. Passing through holes formed in the laterally extending portions 19 and 21 is a shaft 22 which terminates at one end in a pinion 23 fixedly mounted thereon and cooperating with a rack 24 arranged on one edge of the tank 14.

The other end of the shaft 22 is keyed to a second pinion 26 and to the shaft of a motor 27. The second pinion 26 cooperates with a second rack 28 arranged on the opposite edge portion of the tank 14.

It can be seen that rotation of the motor 27 causes rotation of the shaft 22 thereby turning the pinions 23 and 26 causing the same to travel along the respective racks 24 and 28. In this manner, the position of the bracket 18 and the arcuate member 16 can be adjusted over, and in the front-to-rear (transverse) direction of the object 10 in the tank 14.

Also passing through the backet 18 in a direction substantially transverse to the first shaft 22 in a second shaft 29. At one end, the shaft 29 is connected to the shaft of a potentiometer 31 while the opposition end of the shaft 29 is fixedly connected to an annular disc shaped member 32.

Arranged between the end portions of the shaft 29 is a gear 33 which cooperates with a chain 34, in turn meshing with a second gear 36. The gear 36 is mounted on the end of the shaft of a second motor 37.

It can be seen that rotation of the second motor 37 rotates the shaft 29 by means of the chain drive 34. This in turn rotates the shaft of the potentiometer 31 and the disc 32.

Mounted on the outer surface of the disc 32 is a pin 38 which rotatably engages one end of a rod 39. The rod 39 in turn is connected by means of a turnbuckle 41 to a second rod 42. The other end portion of the rod 42 is rotatably connected to a second pin 43 arranged on the surface of an annular disc 44.

The annular disc 44 is mounted on the end portion of a shaft 46, the opposite end of which is rotatably mounted in a depending portion 47 of the bracket 18.

Arranged between the disc 44 and the depending portion 47 of the bracket 18 is a cylindrical member 48. The cylindrical member 48 has imbedded therein an ultrasonic transducer 49. The transducer 49 may be in the shape of an annular disc or in any convenient shape as will be explained more fully hereinafter with respect to further embodiments of the present invention. In any event, the transducer 49 is a transducer which emits a substantially cylindrically shaped beam of ultrasonic vibrations upon electrical energization thereof. Furthermore, the axis of transducer 49 is arranged substantially at the focal point of the parabolically curved surface 17.

Connected to the transducer 49 are conductors 51 and 52, the opposite ends of which are connected to a pulser and receiver 53. The receiver 53 is connected by means of a conductor 54 to the control electrode of a cathode ray tube 56.

Connected to the horizontal deflecting plates of the cathode ray tube 56 by means of conductors 57 and 58 is the output of horizontal deflection system 59.

Also connected to the horizontal deflection system 59 by means of cable conductors 61 and 62 are the tap and terminals of the potentiometer 31.

Connected to the vertical deflection plates of the cathode ray tube 56 by means of conductors 63 and 64 is the trigger and vertical deflection system 66 which is also connected in turn by conductors 67 and 68 to the pulser 53.

One method of testing the object 10 for internal flaws is to subject the entire object 10 to an ultrasonic beam generated by the transducer 49. Since this beam is normally in the shape of a small diameter cylinder, it is necessary for the beam to impinge upon different preselected surface portions of the object 10 before the entire object can be tested.

In FIG. 1, the object 10 is shown formed with a small cylindrical void 69. If the transducer 49 is utilized as a generator and as a receiver, the ultrasonic beam generated by the transducer 49 is caused to impinge on the upper surface of the object 10. A portion of these ultrasonic vibrations is reflected back from the upper surface while the remainder passes through the upper surface of the object 10. When the ultrasonic vibrations passing through the object 10 encounter the upper surface of the void 69, additional ultrasonic vibrations are reflected back towards the transducer. Finally, when the remaining ultrasonic vibrations reach the lower surface of the object 10, these vibrations are also reflected back.

The vibrations reflected back from the various surface portions of the object 10 impinge on the transducer 49 which now acts as a receiver. This produces electrical signals across the transducer 49 which are transmitted to and detected by the receiver 53. The detected signals are applied from the receiver 53 to the control electrode of the cathode ray tube 56.

A representation of a typical pulse arrangement from such a test is shown on the face 71 of the cathode ray tube 56. Since the pulses reflected from the successive horizontal planar strata of the object 10 reach the transducer 49 at different times, they occur on the vertical sweep of the cathode ray tube 56 in their varied time relationship. The first pulse 72 to arrive is the reflection from the upper surface of the object 10. The second pulse 73 to arrive is the reflection from the upper surface of the substantially cylindrical flaw 69 and the last pulse is the pulse reflected from the back or bottom surface of the object 10.

With conventional testing apparatus, in order to produce such a display on the cathode ray tube 56, it would be necessary to arrange the transducer 49 above the object 10 so that the narrow cylindrical beam of ultrasonic vibrations emitted by the transducer 49 would impinge on the object 10 in a direction perpendicular to the upper surface thereof. This will permit the reflected waves to be transmitted back to the transducer.

Therefore, in order to scan the entire object 10, it would be necessary to move the transducer so that it is sequentially arranged directly over different preselected portions of the object 10. However, in accordance with the present invention, the preselected portion of impingement on the surface 10 of the beam of ultrasonic vibrations can be varied by large amounts while the actual position of the transducer 49 is varied by very small amounts.

In the illustrated embodiment of the present invention, instead of moving the transducer 49 so that it is directly over the upper surface of the object 10, it is merely necessary to direct the beam of ultrasonic vibrations toward the parabolic surface portion 17 of the arcuate member 16. When the beam impinges on that segment of the parabolic surface portion which is directly over the desired surface portion of the member 10, the beam of ultrasonic vibrations is reflected so that it impinges on the object 10 at a right angle to the surface thereof. One such beam is shown by the dot-dash lines 76 and 77. The line 76 represents the beam of ultrasonic vibrations emitted by the transducer 49, while the line 77 represents the beam reflected from the parabolic surface portion of the arcuate member 16.

Referring particularly to FIG. 2, different positions of the transmitted and reflected beams are shown. The first beam represented by the dot-dash line 78 corresponds to the emission of the beam when the transducer is in the upper range of its pivotal movement. As the disc 44 is rotated in a counterclockwise direction, the beam emitted by the transducer successively takes the respective positions indicated by the lines 79, 81, 82 and 83. It is apparent that the beams 78 and 83 represent scanning of the longitudinally opposite (left and right) edge portions of the object 10 under test. The remaining beams represent scanning of surface portions between these limiting edge portions.

The apparatus described in FIGS. 1 and 2 is designed to bring about the desired pivotal movement of the transducer 49. When the motor 37 is energized by energizing means not shown, the shaft 29 is rotated by the chain drive 34. This rotates the annular disc 32, thereby rotating the pin 38 which is eccentric to the center of the disc 32. As the pin rotates about the center of the disc 32, the upper end portion of the lever 39 also rotates thereabout providing a reciprocating oscillating movement of the lever 39. It should be noted that the pin 38 is closer to the center of the disc 32 than the pin 43 is to the center of the disc 44. Due to this arrangement, the pin 38 is able to rotate about the center of the disc 32 while the pin 43 merely reciprocates along a short sector of the circular arc of the disc 44.

In this manner, the disc 44, the shaft 46, and the transducer 49 are pivoted back and forth about a central position by continuous rotation of the shaft of the motor 37. The range of this reciprocation and oscillation is shown by the arrows 84 in FIG. 2. It can be seen that this corresponds to the necessary angular movement of the transducer 49 to bring about the maximum desired scanning range for the beam of ultrasonic vibrations.

The transducer may be moved to any particular fixed position between the end portions of the scanning range. By proper adjustment of the turnbuckle 41, it is possible to set the end portions of the scan so that they correspond to the beams reflected on the respective opposite left and right edge portions of the object under test.

The display arrangement shown in FIG. 1 and described hereinabove corresponds to a type of scan known as the "A-Scan" in the field of non-destructive testing. For this type of scan, the beam of ultrasonic vibrations is retained in a substantially stationary position with respect to the given preselected portion of the object being tested. The transducer is pulsed by a series of pulses from the pulser 53. The pulses are spaced sufficiently far apart so that the ultrasonic vibrations generated by the transducer 49 due to each pulse can be transmitted to the object under test and reflected back through the transducer 49 before the application of the next pulse. As explained further hereinabove, with conventional apparatus it would be necessary to move the transducer to a second fixed position in order to have the beam of ultrasonic vibrations emitted thereby impinge on a different preselected portion of the object under test.

However, with the present invention, it can be seen that it is merely necessary to energize the motor 37 momentarily to move the transducer 49 to a new angular position about the axis of the shaft 46.

Therefore, in operation, in order to scan the entire object 10 with ultrasonic vibrations from the transducer 49 with the "A-type Scan," the motor 27 and the motor 37 are energized to position the reflected beam so that the same impinges on a corner of the object 10 under test. This would correspond substantially to the beam 78 shown in FIG. 2. The motor 37 can then be sequentially energized momentarily so that the transducer 49 is moved in discrete steps through a plurality of fixed angular positions about the axis of the shaft 46 until the farther edge portion of the object 10 has been reached. At that point, the motor 27 can be energized to move the entire apparatus some preselected amount along the tank 14 wherein the successive discrete angular movements of the transducer 49 are repeated. This operation continues until the entire object 10 has been subjected to successive beams of ultrasonic vibrations. The apparatus for energizing the motors 27 and 37 are conventional and are not illustrated in order to avoid unnecessarily complicating the drawing.

However, there are additional scanning methods known as the "B-Scan" and the "C-Scan." In the "B-Scan," the transducer 49 is rotated continuously back and forth in a plane perpendicular to a surface portion of the object 10 under test. By use of a long persistence screen on the cathode ray tube, a substantial transverse sectional view of the object under test is provided. This always poses a difficult problem in conventional devices since the rate of continuous movement of the transducer 49 with respect to the stationary object 10 always had to be properly controlled so as to exhibit an accurate display on the cathode ray tube.

It can be seen that the apparatus of FIGS. 1 and 2 is particularly adaptable to this purpose, since the "B-Scan" can be carried out merely by the continuous energization of the motor 37. When this occurs, the transducer 49 is continuously rotated about the focal axis of the parabolic surface of the reflector 17 to scan a substantially planar section of the object 10 under test. The length of the planar section would be substantially equal to the width of the beam of ultrasonic vibrations emitted by the transducer 49. For this type of scanning method, the display on the cathode ray tube 56 would appear as a series of evenly spaced "A-Scan" presentation substantially as shown in FIG. 1.

For the "C-Scan" type of presentation, the ultrasonic beam is caused to traverse back and forth across the test object at spaced intervals until the entire test object is scanned. Thus the "C-Scan" provides a scan of the entire test object. Again, the apparatus of the present invention as shown in FIGS. 1 and 2 can be utilized by arranging the reflector so that the beam of ultrasonic vibrations emitted from the transducer 49 is directed along the desired plane. For this type of scan, the transducer 49 would have to be continuously reciprocated longitudinally by motor 37 and positioned laterally by motor 27.

It is clear that an advantageous relationship is provided by having the arcuate member 16 with a section 17 having a parabolic curvature. The transducer 49 is arranged substantially at the focal point of the section of parabolic curvature so that the reflected beams from the arcuate member 16 are all parallel to one another.

The time between the generation of the ultrasonic waves and the reflection thereof back to the transducer remains the same regardless of the angular position of the transducer 49 about the axis of the shaft 46. That is, the distance between the transducer 49 and the section 17 plus the distance from the section 17 to the upper surface of the object 10 is precisely the same for all angular positions of the transducer 49.

Referring now to FIGS. 3 and 4, a second embodiment of the present invention will be described.

The apparatus identified by numerals corresponding to the numerals of FIGS. 1 and 2 identify like apparatus in FIGS. 3 and 4. In FIG. 3, it can be seen that the object 10 is again immersed in a liquid medium 11 and supported on members 12 and 13 in the tank 14. Arranged above the object 10 is a parabolic mirror 110 with the mirrored surface thereof facing the upper surface of the object 10. The mirror 110 is mounted within the liquid medium 11 by conventional mounting means not illustrated.

Arranged at the focal point of the parabolic mirror 110 is a spherical housing 111 within which is mounted the transducer 112. In FIG. 4, it can best be seen that the transducer 112 is fixedly mounted within the spherical housing 111 with a plastic material 113, having good transmission in the ultrasonic range, arranged between the surface of the transducer and the surface of the housing 11. In FIG. 4, the dot-dash lines 114 correspond to the substantially cylindrically shaped beam of ultrasonic vibrations generated by the transducer 112 upon energization thereof.

It can also be seen that conductors 116 and 117 are connected to opposite sides of the transducer 112 in order to supply energizing potential thereto and to obtain electrical signals therefrom produced by reflected ultrasonic vibrations. The conductors 116 and 117 extend upwardly through the spherical housing 111 through a hollow shaft 118 shown in FIG. 3 to contact slip rings 119 and 120 near the upper end of the tubular member 121 which surrounds and is fixedly connected to the shaft 118 so as to rotate therewith.

The tube 121 is rotatably mounted by means of a bearing 122 in a bracket 123 fixedly mounted on the upper edge of the tank 14.

The upper end of the shaft 118 is connected to the movable shaft of a potentiometer 124. Connected to the potentiometer 124 is a cable 126 carrying the three conductors respectively connected to the opposite ends of the potentiometer and the movable tap thereof, and also connected at their other end to the display device 127. Actually, display device 127 is meant to represent all of the different electronic circuit components utilized for supplying power, energizing the transducer and receiving electrical signals from the transducer to display the same. These circuits are shown in greater detail in FIG. 1, but since these circuits are wholly conventional, no purpose is seen in describing the various circuit elements used for the purposes of the present application.

At the lower end, the shaft 118 is fixedly connected to a U-shaped member 128 which has a pin 129 rotatably mounted thereon and fixedly connected to the spherical housing 111 to support the same. The pin 129 is connected at its other end to a lever 131. The other end of the lever 131 is pivotally connected to a second lever 132 having the opposite end portion thereof rotatably connected to a pin 133. The pin 133 is fixedly mounted on the surface of a disc shaped member 134, which in turn is fixedly mounted to one end of a shaft 136.

The shaft 136 passes through the tubular member 121 in such manner as to be rotatable with respect to the tubular member and engages the shaft of a motor 137. The shaft of the motor 137 is also connected to the movable shaft of a potentiometer 138. A cable 139 is connected to the potentiometer 138 by means of a slip ring, while the other end of the cable 139 is connected to a display device 141 shown for illustrative display purposes as will be explained hereinafter.

Fixedly mounted on the tubular member 121 between the ends thereof is a gear 142 having an opening through which passes the lever 132. The gear 142 meshes with a second gear 143 mounted on the shaft of a second motor 144.

In operation, the parabolic mirror 110 is arranged above the object 10 and its dimensions are chosen so that it extends beyond all four corners of the object. In order to provide an "A-Scan" display of any preselected portion of the object 10, it is merely necessary to position the transducer 112 so that the beam 114 of ultrasonic vibrations generated thereby is directed towards the reflecting surface portion of the parabolic mirror and is reflected thereby towards the preselected portion of the object 10. Any reflections obtained from the object 10 follow a return path opposite to the one just described. These reflected waves or vibrations impinge on the transducer 112, producing electrical signals thereacross depending on the intensity thereof. These electrical signals are applied to the display device 130 to display the type of scan shown on the screen of the display device 130.

To provide the "B-Scan" type of display, the transducer 112 is pivoted in a plane perpendicular to the upper surface of the object 10. This is accomplished by energizing the motor 137 to rotate the shaft 136 and the annular member 134. Since the pin 133 is closer to the center of the disc 134 than the length of the lever 131, the lever 131 will be pivoted upwardly and downwardly by means of the lever 132 as the pin 133 revolves about the center of the disc 134. In this manner, the beam of ultrasonic vibrations generated by the transducer 112 will move back and forth between the center of the parabolic mirror 110 and the outer edge portion thereof. In the arrangement shown in FIG. 3, the type of operation just described will scan approximately one-half of the object 10 in the plane of the beam 114. To scan the remaining half of the object 10, the transducer 112 can be rotated 180° by energizing the motor 144. It can be seen that energization of the motor 144 will rotate the gear 143 and the gear 142 engaged therewith. This rotates the tube 121, thereby rotating the shaft 136 and the various members attached thereto. After rotation of the transducer 112, the remaining portion of the "B-Scan" can be carried out.

If desired, it is clear that the parabolic mirror may be dimensioned so that one-half thereof is larger than the entire width of the object 10 so that the "B-Scan" of the entire width of the object can be carried out without the above described rotation. Also, the various linkages for pivoting the transducer 112 can be arranged so that the transducer 112 actually rotates about the axis of the lever 129 so that the entire "B-Scan" is carried out in the rotation. While for the illustrated arrangement, there would be a dead spot above the transducer 112 when the same is directed towards the shaft 118, it is clear that when the transducer is diametrically opposed to this position, the missing portion of the object 10 will be scanned.

It should be noted that the entire object can be scanned without movement of the bracket 123. This is carried out merely by rotating the spherical housing 111 and the transducer 112 about the axis of the shaft 118 and pivoting the transducer upwardly and downwardly as desired. These motions are carried out by the proper energization of the motors 137 and 144. It is therefore unnecessary with this embodiment to have the entire assembly ride along the tank 14 as shown in FIG. 1.

The specific position of the transducer 112 is easily determined by the positions of the movable taps of the potentiometers 124 and 138, respectively. It should be noted that the respective taps of these potentiometers are each connected to a member which determines the horizontal and vertical position of the transducer 112. Therefore, the voltages produced by these potentiometers can be utilized in the sweep circuits of the display devices 127, 141 and 130 to properly synchronize the display with the position of the transducer. In this manner, when a fault is located in the object 10, the exact position of the fault or flaw can be determined from the position on the display device.

On the display devices 130, 141 and 127, are respectively shown the types of displays for the "A-Scan," "B-Scan," and "C-Scan" of the object 10 under test. It is noted that these various scans can be carried out by merely rotating and pivoting the transducer 112 at the focal point of the parabolic mirror without otherwise moving the transducer with respect to the object 10.

It should also be noted that by means of the cylindrical housing in FIG. 1 and the spherical housing in FIG. 3 the movement of the transducer in the liquid medium 11 produces no turbulence which might affect the transmission of the ultrasonic vibrations.

In the embodiments of FIGS. 1 and 3, the transducer is used as the receiver of the ultrasonic vibrations reflected back from the object under test. For this reason, the reflector devices used with the transducer are arranged so that the beam of ultrasonic vibrations will enter the object under test in a substantially perpendicular direction with respect to the surface of the object. If it is desired to use a separate receiver for displaying the reflected vibrations, the reflecting surfaces can be respectively arranged so that the beam of ultrasonic vibrations will enter the surface of the object 10 under test at any desired preselected angle.

Referring now to FIGS. 5, 6 and 7, still a third embodiment of the present invention will be described. In this embodiment, the object 10 under test is again arranged in a liquid medium 11 on supporting members 12 and 13 in a tank 14. Instead of a simple parabolic mirror, however, a mirror 151 of special multiparabolic construction is fixedly mounted within the liquid medium 11 by conventional mechanical means not shown. The reflecting surface portions 152 of the mirror 151 are coaxial circular annuli each respectively having as profile in radial (vertical) section an arc of a parabola. The parabolas defined by any given radial section are coplanar, confocal, and coaxial, and are confocal and coaxial with the parabolas defined by any other radial section. The axes of all such parabolas coincide with the annular axis. In a given radial section, parabolic arcs equidistant from the common axis are arcs of one and the same parabola; however, adjacent parabolic arcs are arcs of parabolas having non-coincident vertices.

In this embodiment, a spherical housing 153 is again used. However, as shown in FIGS. 6 and 7, the ultrasonic beam 154 generated by the transducer 156 has a substantially rectangular shaped cross-section and flares out in the vertical plane upon emerging from housing 153. This rectangular shape is produced by a biconcave lens 157 arranged between the transducer 156 and the outer surface of the housing 153 which disperses the beam produced by the transducer 156. Also, the housing 153, made of a high attenuating material, has a rectangularly shaped opening 158 which is best seen in FIG. 7. The opening 158 and the space between the lens and the transducer is filled with a plastic material having good transmission properties for ultrasonic vibrations. Therefore, the rectangular shaped opening 158 in the housing 153 operates in the nature of a collimator which in conjunction with the dispersion effect of the biconcave lens 157 produces the rectangularly shaped beam of ultrasonic vibrations emitted from the housing 153. Since the width of the rectangle defining the beam is relatively small, the beam may also be considered as essentially contained and flaring out in a vertical plane which is parallel to and passes between the vertical sides of opening 158. The focal point of the beam substantially coincides with the described common focal point of the parabolas defining mirror 151.

The spherical housing 153 forms one end of a tubular member 159 which is rotatably mounted by means of a bearing 161 in a fixedly mounted bracket 162 connected to the upper edge of the tank 14 about a vertical axis coincident with the annular axis of mirror 153.

As is shown in FIG. 6, the transducer 156 has connected thereto conductors arranged within a cable 163. This cable extends upwardly, in FIG. 5, through the tubular member 159 to slip rings 164 which in turn are connected to a cable 166. The other end of the cable is connected to the display devices 167 and 172.

The tubular member 159 is connected at its upper end to the rotatable shaft 168 of a potentiometer 169. Connected to the terminals of the potentiometer 169 is a cable 171 having conductors connected to the display device 172.

Connected between the ends of the tubular member 159 and fixedly mounted thereon is a gear 173 which meshes with a second gear 174 mounted on the shaft of a motor 176.

In operation, the planar wave transmitted through the opening 158 impinges on different respective parabolic sections of the multiparabolic mirror 151. Each of the respective sections respectively reflects the beam of ultrasonic vibrations impinging thereon so that the same enters the upper surface of the object 10 at an angle substantially perpendicular thereto. Any reflecting surfaces in the object 10 reflect the vibrations impinging thereon back upwardly to the respective parabolic sections back to the transducer 156. The signals produced in the transducer 156 are transmitted through the slip rings 164 and the cable 166 to the display device 167.

It has been pointed out for the embodiments of FIGS. 1 and 3 that the distance traveled by the beam of ultrasonic vibrations remains the same regardless of the respective angular position of the transducer with respect to the parabolic reflecting surface. The difference in the times of arrival had been synchronized with the exact angular position of the transducer and is due to the movement of the transducer in the embodiments of FIGS. 1 and 3.

However, with the multiparabolic mirror reflecting surface, different times of arrival at the display device are automatically provided without any movement of the transducer 156. This can best be seen in FIG. 5, wherein the same planar beam transmitted through the spherical housing 153 impinges at the inner edge of the multiparabolic mirror and substantially near the outer edge thereof. The path followed by the beam impinging on the inner edge is shorter than the path followed by the beam impinging near the outer edge of the multiparabolic mirror. Therefore, for example, the beam reflected from the upper surface of the object 10 for the inner portion 154' of the transmitted beam will follow a shorter path than the beam reflected from the upper surface due to the transmitted beam 154". In this manner, a complete "B-Scan" of the object 10 is produced while maintaining the transducer 156 and the spherical housing 153 in a fixed angular position. The respective position of any flaws located in the object 10 can be ascertained on the display device 167 due to the inherent time delay determined by the respective position of the reflected beam in the planar wave transmitted from the housing 153. In this manner, any possible effect due to turbulence on the transmission of the beam of ultrasonic vibrations is completely eliminated.

If desired, an entire scan of the object 10 may be produced by rotating the tubular member 159. This is done by energizing the motor 176 to turn gears 174 and 173. Continuous rotation of the tubular member 159 produces a continuous scan of the object 10 under test. Again, the position of the movable tap of the potentiometer 169 indicates the particular position of the transducer 156 for this scanning operation. The display device 167 shows a typical "B-Scan" of the object 10 while the display device 172 shows a typical "C-Scan." Of course, it should be appreciated that separate display devices are not needed in FIGS. 3 and 5, but are merely shown for illustrative purposes to indicate the different types of scans that can be provided with the respective embodiments of the present invention. As indicated hereinabove, the three different types of scanning used for ultrasonic flaw detection can be provided by using the embodiments of the present invention. This is accomplished in each of the embodiments with relatively little movement of the generating transducer. The transducer merely pivots or rotates for the scanning purpose. This greatly improves the speed at which the scanning operation may be carried out, thereby cutting down the testing time for the entire object 10 under test.

Although only three embodiments of the invention have been illustrated and described in detail, it is to be expressly understood that the invention is not limited thereto. Various changes can be made in the design and arrangement of the parts without departing from the spirit and scope of the invention as will now be understood by those skilled in the art.

What is claimed is:

1. Apparatus for nondestructively testing a preselected portion of an object by means of an ultrasonic beam comprising reflector means supported above said object and having a plurality of spaced coaxially circular reflecting surfaces, the profile of each surface in a given radial section being an arc of a parabola, adjacent ones of such parabolas being coaxial with each other and with the circle axis of said reflecting surfaces, having a common focal point on said circle axis, and being coplanar, but having non-coincident vertices; transducer means for generating an ultrasonic beam having a focus at said focal point and flaring out in a plane that passes through said circle axis; means for supporting said transducer means at said common focal point of said reflecting surfaces such that successive portions of said ultrasonic beam are reflected from said spaced reflecting surfaces in the plane of incidence thereon and at right angles to said object when said transducer means is maintained in a fixed position whereby said preselected portion of said object is scanned by said ultrasonic beam.

2. Apparatus as defined in claim 1 including means for rotating said transducer means about the aforesaid circle axis whereby the entire surface of said object is scanned by said ultrasonic beam.

References Cited in the file of this patent

UNITED STATES PATENTS

| | | |
|---|---|---|
| 2,592,135 | Firestone | Apr. 8, 1952 |
| 2,593,865 | Erdman | Apr. 22, 1952 |
| 2,740,289 | Van Valkenburg et al. | Apr. 3, 1956 |

FOREIGN PATENTS

| | | |
|---|---|---|
| 314,838 | Italy | Feb. 7, 1934 |